United States Patent
Le Calve et al.

(10) Patent No.: US 12,521,712 B2
(45) Date of Patent: Jan. 13, 2026

(54) MICROFLUIDIC PRECONCENTRATOR

(71) Applicants: CENTRE NATIONAL DE LA RECHERCHE SCIENTIFIQUE, Paris (FR); UNIVERSITE DE STRASBOURG, Strasbourg (FR)

(72) Inventors: Stéphane Le Calve, Strasbourg (FR); Alberto Rodrigues Cuevas, Strasbourg (FR); Irene Lara-Ibeas, Strasbourg (FR); Agathe Leprince, Strasbourg (FR); Michel Wolf, Strasbourg (FR)

(73) Assignees: CENTRE NATIONAL DE LA RECHERCHE SCIENTIFIQUE, Paris (FR); UNIVERSITE DE STRASBOURG, Strasbourg (FR)

( * ) Notice: Subject to any disclaimer, the term of this patent is extended or adjusted under 35 U.S.C. 154(b) by 679 days.

(21) Appl. No.: 17/913,136

(22) PCT Filed: Mar. 9, 2021

(86) PCT No.: PCT/EP2021/055932
§ 371 (c)(1),
(2) Date: Sep. 20, 2022

(87) PCT Pub. No.: WO2021/190918
PCT Pub. Date: Sep. 30, 2021

(65) Prior Publication Data
US 2023/0142136 A1 May 11, 2023

(30) Foreign Application Priority Data
Mar. 24, 2020 (FR) ........................... 2002843

(51) Int. Cl.
*B01L 3/00* (2006.01)
*G01N 1/40* (2006.01)

(52) U.S. Cl.
CPC .......... *B01L 3/5023* (2013.01); *G01N 1/4022* (2013.01); *G01N 1/405* (2013.01);
(Continued)

(58) Field of Classification Search
None
See application file for complete search history.

(56) References Cited

U.S. PATENT DOCUMENTS

| | | |
|---|---|---|
| 2007/0151449 A1 | 7/2007 | Wohltjen et al. |
| 2007/0180933 A1 | 8/2007 | Grate et al. |

(Continued)

FOREIGN PATENT DOCUMENTS

| | | |
|---|---|---|
| WO | 2012/109237 A1 | 8/2012 |
| WO | 2012/135277 A1 | 10/2012 |

OTHER PUBLICATIONS

Camara, et al., "A micro gas preconcentrator with improved performance for pollution monitoring and explosives detection", Analytica Chimica Acta, vol. 688, Issue 2, pp. 175-182, Mar. 2011.

(Continued)

*Primary Examiner* — Lore R Jarrett
(74) *Attorney, Agent, or Firm* — BakerHostetler (57) ABSTRACT

A microfluidic preconcentrator is provided, designed to receive a gas sample containing gaseous pollutants such as volatile organic compounds, to concentrate the gaseous pollutants and to transfer them to an analysis device. An assembly comprising an enclosure, a microfluidic preconcentrator, connectors and a means for holding the microfluidic preconcentrator inside the enclosure, a heating device and a cooling device, are provided.

17 Claims, 3 Drawing Sheets

(52) U.S. Cl.
CPC . *B01L 2300/069* (2013.01); *B01L 2300/0883* (2013.01); *B01L 2300/18* (2013.01)

(56) References Cited

U.S. PATENT DOCUMENTS

| | | |
|---|---|---|
| 2008/0148815 A1 | 6/2008 | Lucas et al. |
| 2012/0121480 A1* | 5/2012 | Frenz ................. B01F 25/4521 422/502 |

OTHER PUBLICATIONS

Lara-Ibeas, et al., "Sub-ppb Level Detection of BTEX Gaseous Mixtures with a Compact Prototype GC Equipped with a Preconcentration Unit", Micromachines, vol. 10, No. 3, 2019.

Rodríguez-Cuevas, et al., "Easy-to-manufacture micro gas preconcentrator integrated in a portable GC for enhanced trace detection of BTEX", Sensors and Actuators B: Chemical, vol. 324, 128690, 2020.

* cited by examiner

MICROFLUIDIC PRECONCENTRATOR

CROSS-REFERENCE TO RELATED APPLICATIONS

This application is a National Stage of International patent application PCT/EP2021/055932, filed on Mar. 9, 2021, which claims priority to foreign French patent application No. FR 2002843, filed on Mar. 24, 2020, the disclosures of which are incorporated by reference in their entirety.

FIELD OF THE INVENTION

The present invention relates to a microfluidic preconcentrator designed to receive a gaseous sample comprising gaseous pollutants, such as volatile organic compounds, to concentrate the gaseous pollutants and transfer them to an analysis device. The present invention relates also to an assembly comprising an enclosure, a microfluidic preconcentrator, connectors and a holding means for holding the microfluidic preconcentrator inside the enclosure.

BACKGROUND

Air pollution, outside and inside, these days represents a major issue for public health and the environment. Gaseous pollutants are present in our environment and have many origins. They can for example originate directly from industrial waste or motor vehicles or from forest fires, or indirectly by the oxidation of organic volatile compounds. The gaseous pollutants can also be detected in the air exhaled by people. In fact, some volatile organic compounds (VOCs) are present in the air exhaled by people suffering from sicknesses such as lung cancers and have molecular signatures according to the sickness. The monoaromatic VOCs, and more particularly the BTEX (benzene, toluene, ethylbenzene and xylenes) compounds are specially designed for their toxicity with respect to organisms and their environmental impact. Although they are petrochemical products of significant value, they are also designated as endocrine disruptors.

Analysis instruments are used to detect, determine and/or measure the quantity of gaseous pollutants in the air such as, for example, UV-visible, infrared spectrometers, direct injection mass spectrometers, gaseous phase chromatographs equipped with flame ionization detector, with photo ionization or electron capture. Furthermore, gaseous phase chromatography coupled with mass spectrometry for example allows the detection and the identification of such compounds in very small quantities, of the order of one part per billion (ppb). A gaseous sample comprising an initial concentration of these gaseous pollutants must be supplied to such analysis devices.

However, very small concentrations of volatile organic compounds, for example of the order of one part per trillion (ppt), cannot be detected directly because they are below the detection limits of the analytical instruments. In order to overcome these detection limit drawbacks, preconcentrators have been developed.

These preconcentrators comprise an adsorption means which makes it possible to trap such gaseous pollutants when the adsorption means is passed through by the gaseous sample comprising an initial concentration of gaseous pollutants. Next, the gaseous pollutants adsorbed by the adsorption means, preferably all of the gaseous pollutants of the gaseous sample, are desorbed from the adsorption means by a flow of pure gas and are thus transferred, for example to an analysis device. The desorbed gaseous pollutants are therefore transferred in a gaseous volume smaller than the volume of the gaseous sample which has passed through the adsorption means such that the gaseous pollutants are transferred for example to an analysis device according to a concentration in gaseous phase greater than the initial concentration of gaseous pollutants in the gaseous sample.

Such adsorption means are notably described in the application WO2012135277 A1 which discloses a chemical preconcentrator for collecting and preconcentrating a chemical substance in a gaseous sample, the preconcentrator comprising a support structure having a surface, an air circuit directed to this surface and a layer on the surface of the support structure, the layer comprising a reactive chemical compound capable of forming a conjugate with the chemical substance.

Some preconcentrators of the prior art use thermal desorption in order to desorb the gaseous pollutants of the gaseous sample which have been previously adsorbed in the adsorption means. Such preconcentrators are placed in a system comprising a heating means, the system being generally linked to an analysis device. Solenoid valves, notably three-way, are first of all configured so that the gaseous sample passes through the adsorption means. Thus, once the gaseous sample has passed through the adsorption means and the gaseous pollutants of the gaseous sample have been adsorbed by the adsorption means, the solenoid valves are reconfigured for a desorption gas to pass through the adsorption means and the preconcentrator is heated so as to desorb the gaseous pollutants from the adsorption means. Once the gaseous pollutants desorbed from the adsorption means have been transferred in the desorption gas to an analysis device, the heating is stopped. The gas thus transferred to the analysis device comprises a concentration of gaseous pollutants greater than the concentration of gaseous pollutants of the gaseous sample. The return to ambient temperature of the adsorption means is then necessary for a new cycle. Cycles of adsorption, of desorption and of transfer of the concentrated gaseous pollutants are thus repeated in order to obtain several analyses on various gas samples. The possibility of rapidly repeating cycles of adsorption, desorption and transfer of gaseous pollutants is particularly important in order to obtain analysis results more rapidly and multiply the number of results. Sometimes, in order to purge the adsorption means of such preconcentrators, the latter is heated to a temperature greater than that necessary for the desorption of the gaseous pollutants which would not have been desorbed previously, the solenoid valves being for example configured to reject the gas to the open air.

The desorption is preferentially performed in a direction opposite to the adsorption of the gaseous pollutants so as to desorb the least volatile gaseous pollutants which will have been adsorbed in the zone of the adsorption means closest to the input through which the gaseous sample was injected.

However, the heating means of the standard preconcentrators of the state of the art using thermal desorption require significant power, generally greater than a few hundreds of watts, in order to heat the adsorption means and obtain the sufficiently rapid desorption of the gaseous pollutants. Thus, microfluidic preconcentrators made of silicon comprising deposits of metal circuits used as heating resistors have been developed because they consume less energy. However, fabrication of such preconcentrators requires specialized installations, such as clean rooms, and the associated microfabrication costs are high. Furthermore, these silicon devices are brittle, not robust and are generally associated with connector sealing problems specific to such devices. Also, the tools necessary for their fabrication are costly and the operation and maintenance costs are high. Thus, the production and the use of such preconcentrators made of silicon is not industrially viable.

Furthermore, the analysis devices used currently are bulky, heavy and require a mains power supply because of their significant energy consumption for powering the heating means of the preconcentrators. Thus, use for measurement and analysis on site with such devices is limited.

In the field of the preconcentrators of gaseous pollutants as described previously, preconcentrators are thus sought that are reliable and robust, not bulky, which can be used on site and which allow a reduction of the time required for a cycle of adsorption, desorption and transmission of the gaseous pollutants in order to repeat these cycles more rapidly. Also, a reduction of the production cost and of the cost of use is sought, in particular a reduction of the operation and maintenance costs, of such preconcentrators.

SUMMARY OF THE INVENTION

The invention relates to a microfluidic preconcentrator designed to receive a gaseous sample comprising gaseous pollutants, concentrate the gaseous pollutants and transfer them to an analysis device, the microfluidic preconcentrator comprising a microfluidic circuit allowing the circulation of a pure gas or a gas comprising gaseous pollutants and comprising at least one input designed to receive said gas and at least one output designed to transfer said gas to an analysis device; an adsorption means for the gaseous pollutants inside the microfluidic circuit between the at least one input and the at least one output; and a heating means of a power less than or equal to 100 watts, preferably less than or equal to 50 watts, the microfluidic circuit and the heating means being designed to heat the adsorption means to a temperature of between 120 and 350° C., preferably between 150 and 250° C.

In particular, the microfluidic circuit is made of a material chosen from among metals, glass or polymers or a combination of at least two of these materials.

A "microfluidic circuit" is understood to be a network of tubes, nozzles, micronozzles in which at least one of the dimensions is less than 1 mm, forming flow channels for a gas from at least one input to at least one output. Alternatively, the microfluidic circuit is included in an element and preferably is hollowed out in at least a part of said element so as to form a cavity corresponding to the microfluidic circuit.

"Power less than 100 watts" is understood to mean an electrical power less than 100 watts, that is to say a nominal electrical power in operating condition less than 100 watts.

The microfluidic circuit and the heating means are designed to heat the adsorption means to a temperature of between 120 and 350° C., preferably between 150 and 250° C., so as to desorb the gaseous pollutants of the gaseous sample which have been previously adsorbed by the adsorption means.

The heating means of the present invention can comprise heating resistors made of metal or of ceramic. Preferentially, the heating resistors have a resistance value of between 2 and 25 ohms, even more preferentially between 5 and 20 ohms.

Advantageously, the heating means comprises at least one ceramic heating element. Such a ceramic heating means is suited to the present invention because ceramics are materials that retain their solidity at very high temperatures and are resistant to thermal shocks. Furthermore, such heating means use little energy to heat up. The ceramic heating means in particular allow a constant and uniform heating to a temperature of the order of 600° C.

"Ceramic" is understood to mean a technical ceramic. "A ceramic heating element" is understood to mean a heating element comprising ceramic or whose coating is made of ceramic.

A gaseous pollutant adsorption means corresponds generally, but without limiting the invention, to a porous chemical adsorbent chosen according to the gaseous pollutant or pollutants targeted for which the adsorption, the desorption then the analysis are desired. The chemical adsorbent is a solid which makes it possible to fix adsorbents (e.g. atoms, ions or molecules) in gaseous or liquid phase via a surface phenomenon such as Van der Waals interactions, dipolar interactions or covalent and ionic chemical bonds.

Advantageously, the heating means is at least fixed onto a first face of the microfluidic circuit or of the element comprising the microfluidic circuit. Preferably, the heating means is at least fixed onto a first face of the microfluidic circuit and as close as possible to the adsorption means. Such a disposition of the heating means allows for a rapid heating of the adsorption means by thermal conduction and makes it possible to avoid any thermal loss. Notably, the thickness of the element comprising the microfluidic circuit is as thin as possible, making it possible to reduce the time required for the heating of the adsorption means. The heating means is preferentially fixed to the microfluidic circuit or else fixed to the element comprising the microfluidic circuit. In a particular embodiment, a thermal paste or a thermal grease is added between the heating means and the microfluidic circuit. This thermal paste makes it possible to enhance the transmission of heat from the heating means to the microfluidic circuit.

Preferentially, the heating means is at least fixed onto a first face of the microfluidic circuit or of the element comprising the microfluidic circuit and onto a second face of the microfluidic circuit opposite the first face of the microfluidic circuit, or else onto a second face of the element comprising the microfluidic circuit. Such a disposition of the heating means allows for a uniform heating of the microfluidic preconcentrator and more specifically of the gaseous pollutant adsorption means.

Preferentially, the microfluidic preconcentrator also comprises a retaining means for retaining the adsorption means inside the microfluidic circuit, the retaining means being designed to be porous to a gas, temperature-resistant and chemically inert. The presence of a retaining means for the adsorption means allows the adsorption means not to be able to be displaced during the use of the microfluidic preconcentrator.

Preferentially, the microfluidic circuit is designed to receive a gaseous flow rate of between 0.1 and 100 ml/min, preferentially between 1 and 50 ml/min, even more preferentially between 5 and 20 ml/min. The gaseous flow rate can be ensured by a pump which can be coupled to a flow rate regulation means such as a mass flow rate regulator or a proportional solenoid valve or a restrictor.

Preferentially, the adsorption means is designed to concentrate targeted volatile organic compounds, such as, for example, benzene, toluene, ethylbenzene and xylenes. Alternatively, the adsorption means is designed to concentrate inorganic compounds such as nitrogen oxides or ammonia.

Preferentially, the element in which the microfluidic circuit is hollowed out or the microfluidic circuit is made of copper, of steel, of aluminum, of stainless steel or of an alloy of metals, the microfluidic circuit being preferably made of aluminum. Such metals or metal alloys allow thermal conduction to the adsorption means by minimizing the thermal losses. Thus, the heating or the cooling of the microfluidic circuit made of metal will make it possible to heat or cool the adsorption means. Metals such as copper, steel, aluminum, stainless steel or an alloy of metals are particularly advantageous for the present invention because they make it possible to obtain a microfluidic circuit or an element in which the microfluidic circuit is hollowed out for which the form is particularly suited to heating by a heating means placed on one or more faces of the microfluidic circuit. In fact, it is possible with such metals to obtain one or more flat surfaces onto which one or more heating means will be able to be fixed in order to conduct the heat optimally to the adsorption means. Also, such materials make it possible to enhance the robustness of the microfluidic circuit and therefore of the microfluidic preconcentrator. Even more preferentially, the microfluidic circuit or the element comprising the microfluidic circuit is made of aluminum. Aluminum is particularly preferred for its thermal conduction capacities, for its micro-milling facility for hollowing out the microfluidic cavity and for its weight.

Alternatively, the microfluidic circuit can be made of a conductive polymer, notably comprising carbon or metals. For example, the microfluidic circuit can be made of vinylidene fluoride, of polylactic acid or of a styrenic polymer such as acrylonitrile butadiene styrene. In particular, these conductive polymers can comprise carbon nanotubes. Such polymers make it possible to obtain a microfluidic circuit or an element in which the microfluidic circuit is hollowed out for which the form is particularly suited to heating by a heating means placed on one or more faces of the microfluidic circuit. In fact, it is possible with such metals to obtain one or more flat surfaces onto which one or more heating surfaces will be able to be fixed in order to conduct the heat to the adsorption means. Also, such materials make it possible to enhance the robustness of the microfluidic circuit and therefore of the microfluidic preconcentrator.

Preferentially, the element in which the microfluidic circuit is hollowed out or the microfluidic circuit of the present invention has an essentially rectangular parallelepipedal geometrical form. Such a form can be obtained with metals such as copper, steel, aluminum, stainless steel or an alloy of metals, with glass or else with a polymer. "Rectangular parallelepipedal" is understood to mean a solid figure delimited by six rectangular faces in which all the corners are right angles and the opposite faces of the parallelepiped are equal. Such a geometrical form has surfaces onto which one or more heating means can easily be fixed. Such a geometrical form cannot be obtained with a microfluidic circuit made of silicon.

The present invention also discloses an assembly comprising an enclosure; a microfluidic preconcentrator as described previously; at least one first connector designed to receive a gas from the outside of the enclosure and transfer it to the at least one input of the microfluidic circuit and at least one second connector designed to receive a gas from the output of the microfluidic circuit and transfer a gas to the outside of the enclosure; and a holding means for holding the microfluidic preconcentrator inside the enclosure.

Preferentially, the assembly also comprises at least one cooling means designed to cool the microfluidic preconcentrator, preferentially to ambient temperature. Preferably, the assembly comprises at least one fan as cooling means. Also, the assembly can comprise at least one fan and an enclosure comprising at least two apertures, the assembly being designed to have a cooling gas, for example ambient air, circulate from the outside of the enclosure to the inside of the enclosure and to have this cooling gas circulate from the inside of the enclosure to the outside of the enclosure.

The rectangular parallelepipedal geometrical form of the microfluidic circuit is particularly suitable for the microfluidic circuit to be cooled by a cooling gas circulating inside the enclosure because such a microfluidic circuit comprises flat surfaces increasing the exchange surface.

Advantageously, the holding means for holding the microfluidic preconcentrator comprises a material from among metals, glass or polymers or a combination of at least two of these materials. The holding means for the assembly is particularly suited to holding the microfluidic preconcentrator at the center of the enclosure in such a way that the microfluidic preconcentrator has the minimum of contact with the other elements of the enclosure. The microfluidic preconcentrator is thus held with the maximum contact with the gas present in the enclosure, for example the ambient air, in the enclosure.

Advantageously, the first connector and the second connector are composed of materials which are resistant to temperature variations. In addition or alternatively, the first connector and the second connector are composed of materials that are chemically inert, that is to say which do not emit reagents and are not very adsorbent to reagents. Preferentially, the first connector and/or the second connector can comprise or consist of ferules. Preferentially, the first connector and the second connector are composed of polymer, particularly of Teflon (PTFE) or of polyetheretherketone (PEEK). Polyetheretherketone is an advantageous material for the present invention because it is resistant to temperature variations, is chemically inert and has low thermal conductivity. The first connector and the second connector can each comprise ferules, these ferules being composed of Teflon (PTFE) or of polyetheretherketone (PEEK).

The assemblies described previously can be powered by a connection to the mains.

Advantageously, the connectors are cylindrical and are connected to the network of tubes, nozzles or micronozzles of the microfluidic circuit, notably making it possible to prevent leaks.

The present invention also discloses an assembly such as those described previously, the assembly further comprising a battery designed to power at least the heating means of the microfluidic preconcentrator. Such an assembly comprising a battery is autonomous and does not need to be connected continuously to a power source for its use in association with a gas pollutant analysis device.

The present invention also discloses a system comprising an assembly such as those described previously; and an analysis device designed to receive and analyze gaseous pollutants originating from said assembly.

The microfluidic preconcentrator of the present invention is particularly suitable for implementing cycles of adsorption, desorption and transfer to an analysis device more rapidly than that of the devices of the prior art, in particular if these prior art devices are powered at very low voltage. The ceramic heating means allows a rapid heating of the preconcentrator while operating at very low voltage, that is to say less than 50 volts, preferably less than 25 volts.

The production of the microfluidic preconcentrator of the present invention does not require particular installations such as a clean room, which makes it possible to reduce its cost.

The person skilled in the art will be able to adapt the adsorbent according to the gaseous pollutants targeted. Also, the person skilled in the art will be able to adapt the retaining means according to the adsorption means and the material of the microfluidic circuit or of the element comprising the microfluidic circuit according to the adsorption means. Also, the person skilled in the art will be able to adapt the heating means and its power according to the adsorption means and the temperature to be reached to desorb the targeted gaseous pollutants from the adsorption means.

BRIEF DESCRIPTION OF THE DRAWINGS

Other features, details and advantages of the invention will become apparent on reading the description given with reference to the attached drawings given by way of example and which represent, respectively.

DETAILED DESCRIPTION

The heating means of the present invention is suitable for operating at very low voltages, that is to say less than 50 volts. Preferably, the microfluidic preconcentrator of the present invention is particularly suitable for operating at voltages less than 25 volts, every more preferentially voltages less than or equal to 15 volts. Coincidentally, the microfluidic preconcentrator of the present invention is suitable for operating at current intensities less than or equal to 4 amperes, preferably less than or equal to 3 amperes. It is understood that the voltage and current intensity values indicated are nominal values. In particular, the intensity of the current decreases when the temperature increases.

In some embodiments, the microfluidic circuit can be comprised in an element, the element comprising at least one first part in which the microfluidic circuit is hollowed out on a top face of said first part and at least one second part which is placed and fixed onto said top face of the first part in such a way that the microfluidic circuit is inside the element formed by the first part and the second part. An element comprising two parts is particularly advantageous for being able to access the adsorption means by separating the parts, making it possible to recycle, that is to say reuse, the microfluidic preconcentrator by changing the adsorption means and/or the retaining means. Thus, a single microfluidic circuit will allow the concentration of different gaseous pollutants from several gas samples. Preferably, all the parts of the microfluidic circuit are composed of the same material in order to obtain a uniform heat transfer in the microfluidic circuit.

Alternatively, the element comprising the microfluidic circuit is composed of a single part.

The adsorption means can comprise a chemical adsorbent such as, but without limiting the invention to these adsorbents, graphitized carbon black, compounds composed of metal ions and organic ligands ("metal-organic framework"), mesoporous silicas, zeolite compounds or combinations of at least two of these adsorbents. The person skilled in the art will be able to adapt the composition of the adsorption means according to the gaseous pollutants targeted.

In some embodiments, the retaining means for retaining the adsorption means are disposed on the one hand between the at least one input of the microfluidic circuit and the adsorption means and on the other hand between the adsorption means and the at least one output of the microfluidic circuit. The retaining means are chosen in such a way that it cannot retain gaseous pollutants despite the increase in temperature (desorption) and that it reduces as little as possible the flow of the gas through the microfluidic circuit. The retaining means can for example comprise glass wool, quartz, sintered metal, glass, ceramic.

In some particular embodiments, the retaining means are adapted so as to direct the flow of the gas in a particular way suited to homogenizing the flow in the microfluidic circuit and, more specifically, in the adsorption means.

In some embodiments, the enclosure is designed to allow a circulation of a cooling gas, for example the ambient air, through the enclosure via at least two apertures in the enclosure. The apertures in the enclosure are particularly designed to allow the circulation of air as close as possible to the microfluidic circuit or the element comprising the microfluidic circuit. The circulation of air in the enclosure makes it possible to reduce the temperature of the enclosure and of the elements present in the enclosure after heating. Notably, the circulation of air makes it possible to reduce the temperature of the microfluidic circuit and thus of the adsorption means. Also, the cooling means, when they comprise at least one fan, are particularly suitable for favoring the circulation of air in the enclosure. When the assembly comprises apertures in the enclosure and at least one fan, the apertures and the at least one fan are particularly designed to allow the circulation of air through the enclosure so as to cool the enclosure, the elements in the enclosure and, in particular, the microfluidic circuit and the adsorption means. The cooling means make it possible to favor the thermal convection of the elements.

During a microfluidic preconcentrator operating cycle, the adsorption means fix the gaseous pollutants of a gaseous sample by its passage in the microfluidic circuit. During the desorption phase, the heating means heat the adsorption means so as to desorb the gaseous pollutants in order to transfer the gaseous pollutants to an analysis device. After the desorption and during the cooling to ambient temperature, the air in the enclosure is renewed rapidly by the cooling means, for example at least one fan which allows the circulation of air.

In some embodiments, the enclosure is made of a material chosen from among metals, glass or polymers or a combination of at least two of these materials. Preferably, the enclosure is composed of materials comprising polymers. In particular, the enclosure is at least partially made of polyetheretherketone.

In some embodiments, the holding means can comprise springs with insulating layers at the end in contact with the microfluidic preconcentrator so as to limit the inappropriate heat transfers. The springs are particularly suitable because they allow the microfluidic preconcentrator to be held by a small contact surface. In particular, the springs of the holding means are fixed by a first end to the enclosure and by a second end opposite the first to the heating means. The holding means can also comprise thin screws fixed by a first end to the microfluidic preconcentrator and fixed by a second end opposite the first end to the enclosure.

Preferentially, said at least first and second connectors of the set are designed to avoid heat losses. Such first and second connectors allow the transfer of the gaseous mixture upstream and downstream of the preconcentrator.

Preferably, the at least one first connector and the at least one second connector are made of polyetheretherketone because of the temperature resistance of this material, its chemical inertia and its low thermal conductivity. Preferably, the assembly comprises ferules ensuring the sealing of the connectors on the part linked to the microfluidic preconcentrator and are made of polyetheretherketone, the rest of the connector being able to be produced in another material, namely a metal or a polymer.

The microfluidic preconcentrator of the present invention is particularly lightweight. In particular, the microfluidic circuit, the adsorption means and the retaining means retaining the microfluidic preconcentrator of the present invention have a total weight less than 5 grams for a size of approximately or less than $4 \times 15 \times 30$ mm$^3$. The ceramic heating means are also particularly suitable because of its weight which is of the order of a few grams for sizes of approximately or less than $1 \times 10 \times 10$ mm$^3$. Such a weight synergistically makes it possible to reduce the time needed to heat or cool the microfluidic circuit and more particularly the adsorption means in order to desorb the gaseous pollutants.

The size of the microfluidic preconcentrator of the present invention also makes it possible to use a quantity of adsorbent of 1 to 40 mg, preferentially of 2 to 20 mg, even more preferentially of 2 to 10 mg. Thus, the quantity of adsorbent necessary for the implementation of the microfluidic preconcentrators of the present invention is less than that of the standard microfluidic preconcentrators of the prior art.

In some particular embodiments, the adsorption means comprise at least two adsorbents that may be different or not separated by at least one separator element. The separator elements are designed to be porous to a gas, temperature-resistant and chemically inert. The separator elements can be identical to the retaining means. An adsorption means comprising several different adsorbents allow the fixing of several gaseous pollutants at a time, making it possible to implement a single cycle of adsorption, desorption and transfer of a gaseous sample for analysis from several gaseous pollutants. Alternatively, the adsorption means comprise several adsorbents not separated by separator elements. Thus, the successive layers of adsorbents of similar or non-similar sizes can be disposed to constitute the adsorption means.

In a particular embodiment, the retaining means can be an adsorbent. In such a case, the retaining means and the adsorption means coincide. For example, the adsorbent can comprise carbon nanotubes and be also a retaining means.

The connectors of the present invention can correspond to couplings limiting the leaks of fluid and having a high resistance, such as Swagelok products.

The microfluidic circuit of the preconcentrator can have different configurations such as, for example, a square, cylindrical or serpentine-form configuration. The square and serpentine-form configurations are particularly presented in FIGS. 1 and 2. The person skilled in the art will be able to adapt the configuration according to the gaseous pollutants targeted and the adsorption means used.

The different embodiments presented previously are not limiting and can be combined with one another. Furthermore, the present invention is not limited to the two configurations of FIGS. 1 and 2 and to the embodiments previously described.

Figure 1:
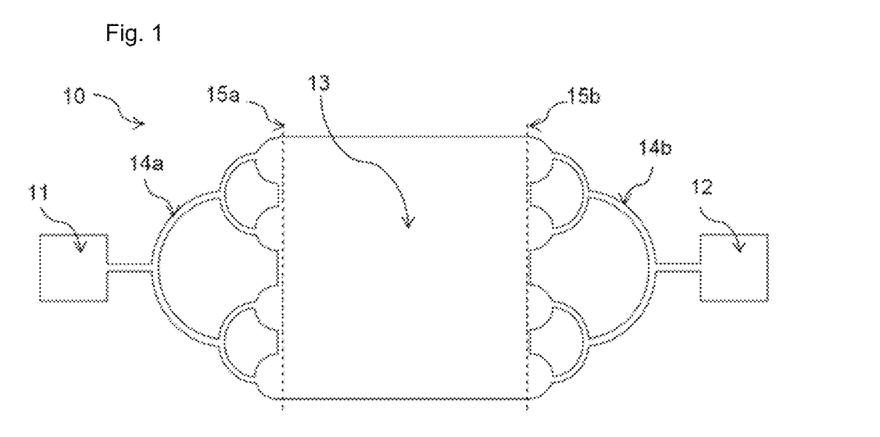
FIG. 1 illustrates a microfluidic circuit configuration that is a square configuration.

FIG. 1 illustrates a first configuration of the microfluidic circuit that is a square configuration 10 in which a gas can circulate. The square configuration 10 comprises an input 11 of the microfluidic circuit and an output 12 of the microfluidic circuit. Such a square configuration also comprises a square zone 13 where the adsorption means are disposed. Disposed between the square zone 13 and the input 11 of the microfluidic circuit are tubes or nozzles in a network 14a allowing the circulation of the gas from the input 11 to the square zone 13. Similarly, disposed between the square zone 13 and the output 12 of the microfluidic circuit are tubes or nozzles 14b allowing the circulation of the gas from the square zone 13 to the output 12 of the microfluidic circuit. Optionally, the microfluidic circuit having a square configuration comprises retaining means (not represented) for retaining the adsorption means which are positioned, in a square configuration of the microfluidic circuit, on the sides 15a and 15b of the square zone 13, the sides 15a and 15b being represented by a dotted line.

In a particular embodiment (not represented) which can be combined with the other embodiments, the retaining means are disposed in the microfluidic circuit so as to divide the gas flow of the gaseous sample in order for it to be diffused uniformly to the adsorption means.

Figure 2:
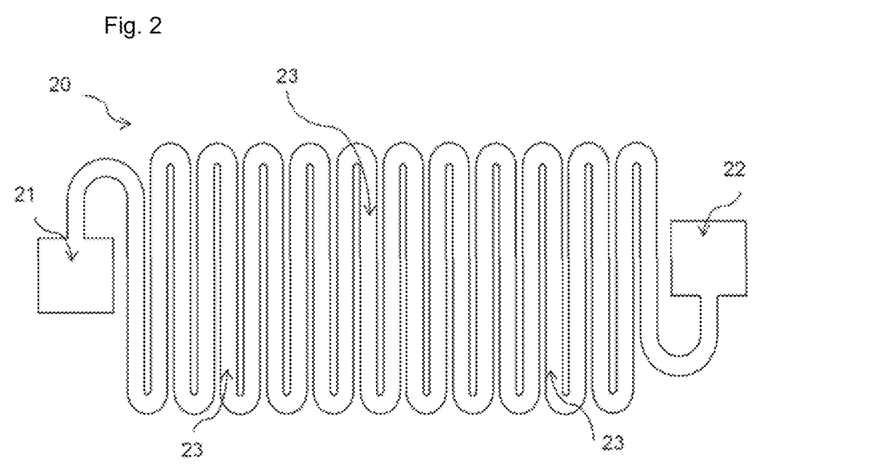
FIG. 2 illustrates a microfluidic circuit configuration that is a serpentine-formed configuration.

FIG. 2 illustrates a second microfluidic circuit configuration that is a serpentine-form configuration 20 in which a gas can circulate. This configuration comprises an input 21 of the microfluidic circuit and an output 22 of the microfluidic circuit. Such a serpentine-form configuration also comprises a zone 23 composed of a single tube linking the input 21 to the output 22 of the microfluidic circuit. The tube of the zone 23 has meanders in which the adsorption means are disposed. Optionally, the microfluidic circuit having a serpentine-form configuration comprises retaining means (not represented) for retaining the adsorption means.

The configurations of FIGS. 1 and 2 can be combined with the different embodiments presented. Other configurations may be suitable for the implementation of the invention and the configurations of FIGS. 1 and 2 are not limiting.

In a particular exemplary embodiment, the microfluidic circuit comprises a rectilinear and hollow cylinder constituting a first part in which the adsorption means are placed, the first part being for example made of aluminum. A second part, for example made of aluminum and with a size of $3 \times 15 \times 30$ mm$^3$, surrounds this first part and is disposed in such a way that the rectilinear and hollow cylinder extends over the sides of the second part. In this first embodiment, the heating means of a power less than or equal to 50 watts are composed of two 5- or 10-ohm ceramic resistors with a size of $10 \times 10 \times 1$ mm$^3$ which are disposed on the second part, on a first face of the second part and on a second face of the second part, opposite the first face. In this first particular embodiment, the diameter of the interior of the rectilinear and hollow cylinder is 1.65 mm. 5 mg of adsorbent is disposed inside the first part and is held by glass wool on either side of the adsorbent in the first part. A first connector made of polyetheretherketone (PEEK) is disposed at the input of the first part and a second connector made of polyetheretherketone (PEEK) is disposed at the output of the first part. The weight of such a microfluidic circuit is approximately 2 g. Such a microfluidic preconcentrator can, by virtue of the heating means, reach a temperature of 200° C. in a time of approximately 24 seconds with a voltage of 14 volts and a current intensity of 3.15 amperes.

An assembly comprising the particular exemplary embodiment previously described can for example be implemented to perform several adsorption, desorption and transfer cycles in 8 minutes, comprising 4 minutes of total adsorption time of the gaseous pollutants of the gaseous sample and 4 minutes of total heating/cooling cycle time.

In some embodiments, the heating means are disposed over all of at least one face of the microfluidic circuit.

Figure 3:
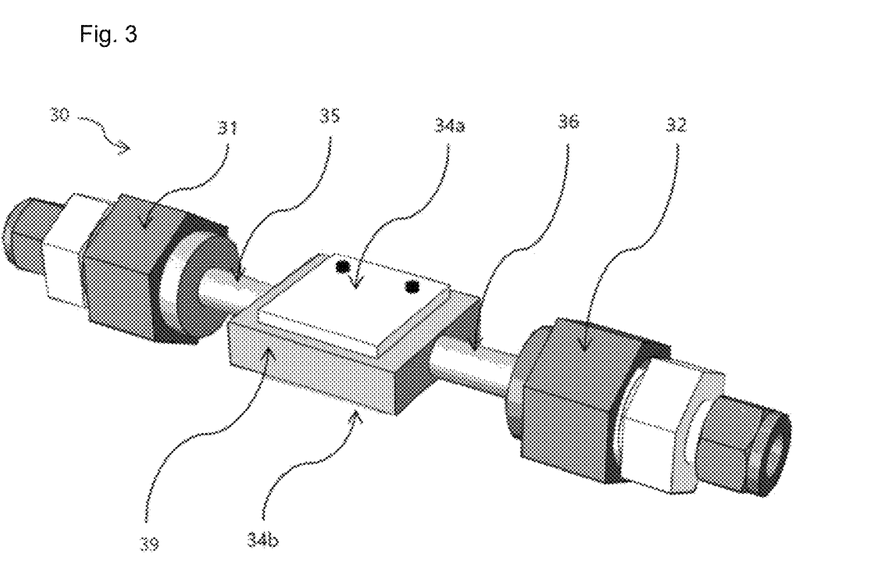
FIG. 3 illustrates a microfluidic preconcentrator to which a first connector and a second connector are fixed.

FIG. 3 illustrates a microfluidic preconcentrator 30 comprising a microfluidic circuit 39 onto which are fixed a first connector 31 and a second connector 32. The heating means of the microfluidic preconcentrator 30 comprise two ceramic resistors 34a and 34b which make it possible to heat the microfluidic circuit 39. The ceramic resistor 34b is disposed on a face of the microfluidic circuit opposite the face on which the ceramic resistor 34a is disposed. The ceramic resistor 34b is similar to the ceramic resistor 34a. The first connector 31, preferentially made of polyetheretherketone, is connected at the input of the microfluidic circuit by a first end to an input 35 of the microfluidic circuit 39. The second end of the first connector 31 is designed to receive a gaseous sample. The second connector 32 comprises a first end connected to the at least one output 36 of the microfluidic circuit 39 and allows the transfer of a gas from said output 36 to a second end of the second connector which is designed to transmit a gas to an analysis device.

The microfluidic preconcentrator 30 has an essentially rectangular parallelepipedal geometrical form.

Figure 4:
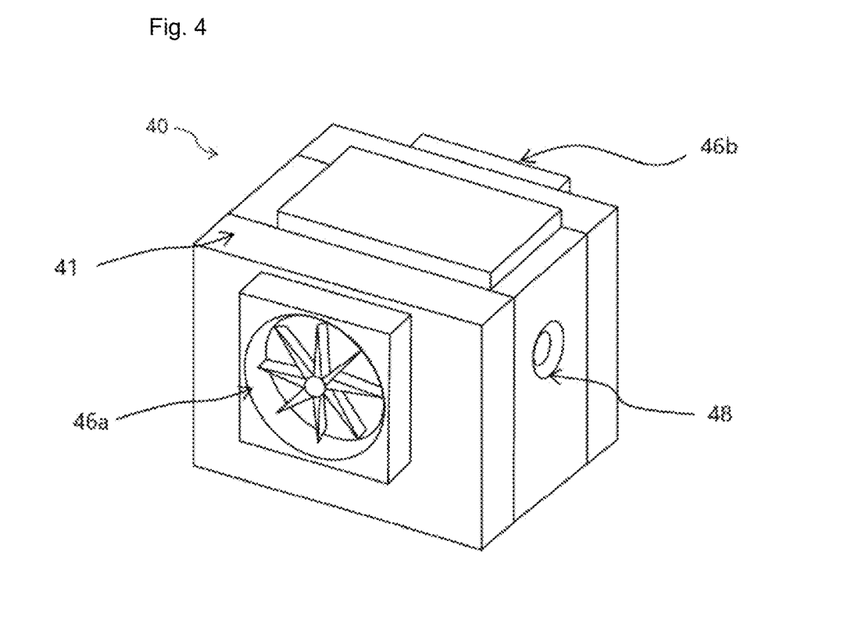
FIG. 4 illustrates an assembly comprising an enclosure comprising a microfluidic preconcentrator.

FIG. 4 illustrates an assembly 40 comprising an enclosure 41, a microfluidic preconcentrator inside the enclosure (not visible), a holding means (not visible) and a cooling means. The enclosure 41, the holding means, the first connector and the second connector make it possible to hold the microfluidic preconcentrator inside the enclosure while limiting the physical contents between the microfluidic preconcentrator and the other elements. Similarly, the assembly 40 is designed in such a way that the microfluidic preconcentrator is in maximal contact with the ambient air in the enclosure. The cooling means are composed of a first fan 46a and of a second fan 46b allowing the circulation of air inside the enclosure 41. The first and second fans 46a, 46b allow the circulation of the air from the outside of the enclosure and through the latter, so as to reduce the temperature of the enclosure 41 and of the elements in the enclosure 41, in particular so as to reduce the temperature of the microfluidic preconcentrator (not visible) while the fans are operating.

The assembly 40 of FIG. 4 comprises a first aperture 48 designed to allow the connection between the microfluidic preconcentrator and an analysis device in order to be able to transfer a gas comprising desorbed gaseous pollutants to said analysis device. Likewise, a second aperture (not visible), on a face of the enclosure opposite the face of the enclosure comprising the aperture 48, is designed to allow the connection between the microfluidic preconcentrator and a device, for example a device for injecting a gas.

Figure 5:
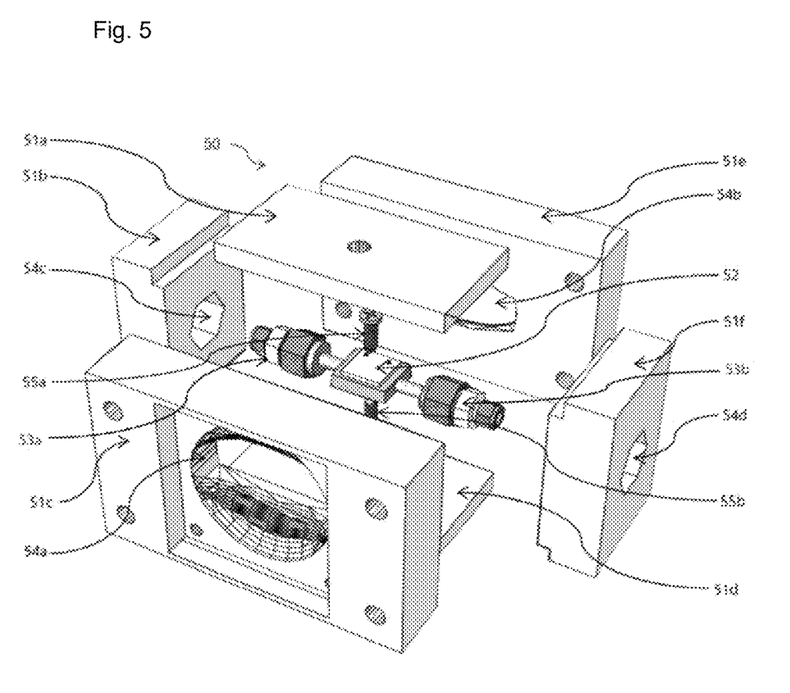
FIG. 5 illustrates an assembly comprising an enclosure in an exploded view comprising a microfluidic preconcentrator.

FIG. 5 illustrates a second assembly 50 comprising an enclosure similar to that described in FIG. 4 but this time with an exploded view comprising several parts 51a, 51b, 51c, 51d, 51e, 51f, a microfluidic preconcentrator 52 inside the enclosure, the microfluidic preconcentrator 52 being connected to two connectors 53a, 53b. The enclosure comprises two apertures 54a, 54b designed for the passage of air and to accommodate two fans, and two apertures 54c, 54d designed respectively for the passage of the first connector 53a and of the second connector 53b. The enclosure can comprise a holding means for holding the microfluidic preconcentrator comprising two screws 55a, 55b making it possible to hold the microfluidic preconcentrator 52 in the enclosure. In particular, the holding means make it possible to hold the heating means against the microfluidic circuit. The enclosure is closed during the use of the assembly 50.

In a particular embodiment of the invention, the microfluidic preconcentrator comprises a battery allowing the heating means to be powered. The preconcentrator is autonomous and is portable, not needing to be connected to a mains power source for its use with an enclosure as previously described and/or an analysis device.

In a particular embodiment of the invention, the enclosure comprises a battery allowing at least the cooling means to be powered. The assembly comprising a battery is autonomous and is portable, not needing to be connected to a mains power source for its use with an analysis device.

In a particular embodiment, the microfluidic preconcentrator as described previously comprises temperature sensors. Such temperature sensors can be fixed to the microfluidic circuit or to the element comprising the microfluidic circuit. In particular, the temperature sensors can be incorporated in the element comprising the microfluidic circuit and preferably as close as possible to the adsorption means. Such sensors make it possible to measure the temperature of the microfluidic sensor and notably determine the temperature of the adsorption means and thus assess the need or not to modify the temperature during a microfluidic circuit heating step or else during a microfluidic circuit cooling step in order to determine when a new adsorption cycle can begin. The heating means can be servocontrolled on a regulator which adapts the power supply of the heating means according to the temperature picked up by the temperature sensors.

Also, the enclosure as described previously can comprise temperature sensors in order to measure the temperature inside and/or outside the enclosure.

The assembly 40 is configured for the implementation of a method for concentrating gaseous pollutants and injecting into an analysis device designed to receive gaseous pollutants comprising:
  the supply of a gas comprising gaseous pollutants to the at least one input (not represented) of the microfluidic circuit of the microfluidic preconcentrator 42 via a first connector;
  the adsorption of gaseous pollutants in the adsorption means (not represented) of the microfluidic preconcentrator 42;
  the desorption of gaseous pollutants adsorbed in the adsorption means of the microfluidic preconcentrator 42; and
  the transfer of said gaseous pollutants from the at least one output of the microfluidic preconcentrator 42 to an analysis device (not represented) suitable for receiving gaseous pollutants via a second connector.

Notably, the assemblies of the present invention allow a desorption of gaseous pollutants by heating of the adsorption means to a temperature of between 120 and 350° C., preferably between 150 and 250° C., in a time of between 5 and 30 seconds. Preferentially, once the maximum temperature is reached, this temperature is maintained for a certain time to ensure the total desorption of the molecules. The holding time of this maximum temperature is of the order of 30 to 120 seconds. Also, the assemblies of the present invention allow a cooling of the preconcentrator and of the adsorption means to ambient temperature, i.e. generally 20° C., in less than 120 seconds, approximately 90 seconds.

Notably, when the microfluidic preconcentrator is made of aluminum, it can be used for numerous cycles of adsorption, desorption at a temperature of between 120 and 350° C. and gas transmission without being damaged.

The microfluidic preconcentrator of the present invention can be placed within a six-way injection loop for its incorporation in gas phase chromatography.

The different embodiments presented in this description are not limiting and can be combined with one another. Furthermore, the present invention is not limited to the embodiments previously described but extends to any embodiment falling within the scope of the claims.

The invention claimed is:

1. An assembly comprising:
   an enclosure;
   a microfluidic preconcentrator receiving a gaseous sample comprising gaseous pollutants, concentrating the gaseous pollutants, and transferring the gaseous pollutants to an analysis device, the microfluidic preconcentrator comprising:
      a microfluidic circuit allowing circulation of a pure gas or a gas comprising gaseous pollutants and comprising at least one input receiving said gas and at least one output transferring said gas to an analysis device, the microfluidic circuit being made of a material chosen from among metals, glass, or polymers, or a combination thereof;
      an adsorption means for the gaseous pollutants inside the microfluidic circuit between the at least one input and the at least one output of the microfluidic circuit; and
      a heating means of a power less than or equal to 100 watts, the heating means being at least fixed onto a first face of the microfluidic circuit,
      the microfluidic circuit and the heating means heating the adsorption means to a temperature of between 120 and 350° C.,
   at least one first connector receiving a gas from outside the enclosure and transferring said gas received from outside the enclosure to the at least one input of the microfluidic circuit, and
   at least one second connector receiving a gas from the at least one output of the microfluidic circuit and transferring said gas received from the at least one output to outside of the enclosure; and
   a holding means for holding the microfluidic preconcentrator inside the enclosure, the holding means comprising two screws or springs with insulating layers at an end in contact with the microfluidic preconcentrator, the holding means being fixed by a first end to the enclosure and by a second end opposite the first end to hold the heating means against a part to be heated.

2. The assembly as claimed in claim 1, the heating means comprising at least one ceramic heating element.

3. The assembly as claimed in claim 1, the heating means being fixed at least onto the first face of the microfluidic circuit, and onto a second face of the microfluidic circuit opposite the first face of the microfluidic circuit.

4. The assembly as claimed in claim 1, the microfluidic preconcentrator further comprising a means for retaining the adsorption means inside the microfluidic circuit, the retaining means being porous to a gas, temperature-resistant, and chemically inert.

5. The assembly as claimed in claim 1, the adsorption means comprising a chemical adsorbent comprising graphite carbon black, compounds composed of metal ions and organic ligands, mesoporous silicas, or zeolite compounds, or a combination thereof.

6. The assembly as claimed in claim 1, the microfluidic circuit being made of copper, steel, aluminum, stainless steel, or of an alloy of metals.

7. The assembly as claimed in claim 6, the microfluidic circuit being made of aluminum.

8. The assembly as claimed in claim 1, the microfluidic circuit having a rectangular parallelepipedal form.

9. The assembly as claimed in claim 1, the microfluidic circuit being made of a conductive polymer.

10. The assembly as claimed in claim 1, comprising:
    at least one cooling means to cool the microfluidic preconcentrator to ambient temperature.

11. The assembly as claimed in claim 1, the holding means comprising a material chosen from among metals, glass, or polymers, or a combination thereof.

12. The assembly as claimed in claim 1, said at least one first connector and at least one second connector being made of Teflon (PTFE) or of polyetheretherketone (PEEK).

13. The assembly as claimed in claim 1, further comprising a battery to power at least the heating means of the microfluidic preconcentrator.

14. A system comprising:
    an assembly as claimed in claim 1, and
    an analysis device to receive gaseous pollutants.

15. The assembly as claimed in claim 1, the heating means having a power less than or equal to 50 watts.

16. The assembly as claimed in claim 1, wherein the microfluidic circuit and the heating means heat the adsorption means to a temperature of between 150 and 250° C.

17. The assembly as claimed in claim 1, the cooling means comprising at least one fan.

* * * * *